# (12) United States Patent
Kwon et al.

(10) Patent No.: US 12,127,180 B2
(45) Date of Patent: Oct. 22, 2024

(54) SYSTEM AND METHOD FOR INDICATING WIRELESS CHANNEL STATUS

(71) Applicant: Futurewei Technologies, Inc., Addison, TX (US)

(72) Inventors: Young Hoon Kwon, Laguna Niguel, CA (US); Pengfei Xia, San Diego, CA (US); Bin Liu, San Diego, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days.

(21) Appl. No.: 18/355,543

(22) Filed: Jul. 20, 2023

(65) Prior Publication Data

US 2023/0362911 A1 Nov. 9, 2023

Related U.S. Application Data

(62) Division of application No. 15/987,220, filed on May 23, 2018, now Pat. No. 11,743,879.

(Continued)

(51) Int. Cl.
*H04W 72/044* (2023.01)
*H04B 7/06* (2006.01)
*H04B 7/08* (2006.01)
*H04L 5/00* (2006.01)
*H04W 72/12* (2023.01)
*H04W 72/23* (2023.01)

(52) U.S. Cl.
CPC ........ *H04W 72/046* (2013.01); *H04B 7/0695* (2013.01); *H04B 7/088* (2013.01); *H04L 5/00* (2013.01); *H04W 72/12* (2013.01); *H04W 72/23* (2023.01)

(58) Field of Classification Search
None
See application file for complete search history.

(56) References Cited

U.S. PATENT DOCUMENTS 10,673,685 B2* 6/2020 Akoum ................. H04B 7/088
2018/0131685 A1* 5/2018 Sridhar ................. H04L 9/3226
(Continued)

FOREIGN PATENT DOCUMENTS

CN 103945447 A 7/2014
CN 104770039 A 7/2015
(Continued)

OTHER PUBLICATIONS

"3rd Generation Partnership Project; Technical Specification Group Radio Access Network; NR; Physical layer procedures for control (Release 15)," 3GPP TS 38.213, V1.0.0, Technical Specification, Sep. 2017, 16 pages.
(Continued)

*Primary Examiner* — Christopher T Wyllie
(74) *Attorney, Agent, or Firm* — Slater Matsil, LLP

(57) ABSTRACT

A method for operating a user equipment includes receiving a first frame on a first channel associated with a first beam identified during a beam failure recovery procedure, and determining that an assumed quasi-co-located relationship exists between the first channel and the first beam, and based thereon, decoding the first frame in accordance with a first reference signal on the first channel and using a first spatial domain receive filter that was used to decode the first beam.

24 Claims, 8 Drawing Sheets

Related U.S. Application Data

(60) Provisional application No. 62/581,293, filed on Nov. 3, 2017.

(56) References Cited

U.S. PATENT DOCUMENTS

| | | | | |
|---|---|---|---|---|
| 2018/0205585 | A1* | 7/2018 | Sadiq | H04L 5/0023 |
| 2018/0206170 | A1* | 7/2018 | Nagaraja | H04W 36/305 |
| 2018/0212800 | A1* | 7/2018 | Park | H04L 5/0057 |
| 2018/0227035 | A1* | 8/2018 | Cheng | H04B 7/0626 |
| 2018/0302889 | A1* | 10/2018 | Guo | H04W 72/046 |
| 2018/0368142 | A1* | 12/2018 | Liou | H04W 74/0808 |
| 2019/0053312 | A1* | 2/2019 | Xia | H04B 7/0695 |
| 2019/0058517 | A1 | 2/2019 | Kang et al. | |
| 2019/0075014 | A1* | 3/2019 | Zhou | H04W 74/0833 |
| 2019/0082335 | A1* | 3/2019 | Yu | H04W 74/0833 |
| 2019/0115955 | A1* | 4/2019 | John Wilson | H04L 5/0055 |
| 2019/0182821 | A1* | 6/2019 | You | H04W 16/28 |
| 2019/0239212 | A1* | 8/2019 | Wang | H04L 5/0051 |
| 2020/0112993 | A1* | 4/2020 | Tsai | H04B 7/0617 |
| 2020/0145079 | A1* | 5/2020 | Marinier | H04W 72/23 |
| 2020/0374960 | A1* | 11/2020 | Deenoo | H04B 7/0695 |
| 2021/0204346 | A1* | 7/2021 | Ye | H04B 7/00 |
| 2021/0288702 | A1* | 9/2021 | Grant | H04B 7/0695 |
| 2021/0337551 | A1* | 10/2021 | Xia | H04W 52/0216 |

FOREIGN PATENT DOCUMENTS

| | | |
|---|---|---|
| WO | 2016099728 A1 | 6/2016 |
| WO | 2016127403 A1 | 8/2016 |
| WO | 2017024516 A1 | 2/2017 |
| WO | 2017026794 A1 | 2/2017 |
| WO | 2017135696 A1 | 8/2017 |

OTHER PUBLICATIONS

CATT, "Consideration on beam recovery mechanism", 3GPP TSG RAN WG1 Meeting #88, R1-1702048, Feb. 13-17, 2017, 4 Pages, Athens, Greece.

Huawei et al., "Beam failure recovery design details", 3GPP TSG RAN WG1 Meeting #90bis, R1-1717302, Oct. 9-13, 2017, 7 Pages, Prague, Czech Republic.

MCC Support, "Draft Report of 3GPP TSG RAN WG1 #90bis v0.1.0, (Prague, Czech Rep, Oct. 9-13, 2017)," 3GPP TSG RAN WG1 Meeting #91, Reno, Nevada, Nov. 27-Dec. 1, 2017, 174 pages.

MCC Support, "Final Report of 3GPP TSG RAN WG1 #AH_NR3v1.0.0, (Nagoya, Japan, Sep. 18-21, 2017)," 3GPP TSG RAN WG1 Meeting #90bis, R11-1716942, Prague, Czech Rep, Oct. 9-13, 2017, 104 pages.

Nokia et al., "Beam indication, Measurements and Reporting", 3GPP TSG RAN WG1 Meeting #90bis, R1-1718511, Oct. 9-13, 2017, 12 Pages, Prague, Czech Republic.

Qualcomm, "Summary on Beam Management Offline", 3GPP TSG RAN WG1 Meeting #90AH, R1-1716758, Sep. 18-21, 2017, 21 Pages, Nagoya, Japan.

Guangdong Oppo Mobile Telecom, "On Beam Recovery Mechanism," 3GPP TSG RAN WG1 NR Ad-Hoc#2, R1-1710144, Jun. 27-30, 2017, 6 pages, Qingdao, P.R. China.

VIVO, "Discussion on beam failure recovery procedure," 3GPP TSG RAN WG1 NR Ad Hoc #3, R1-1715620, Sep. 18-21, 2017, 7 pages, Nagoya, Japan.

CATT et al., "Beam recovery and RLF," 3GPP TSG-RAN WG2 Meeting #99, Aug. 21-25, 2017, 4 pages, Berlin, Germany.

\* cited by examiner

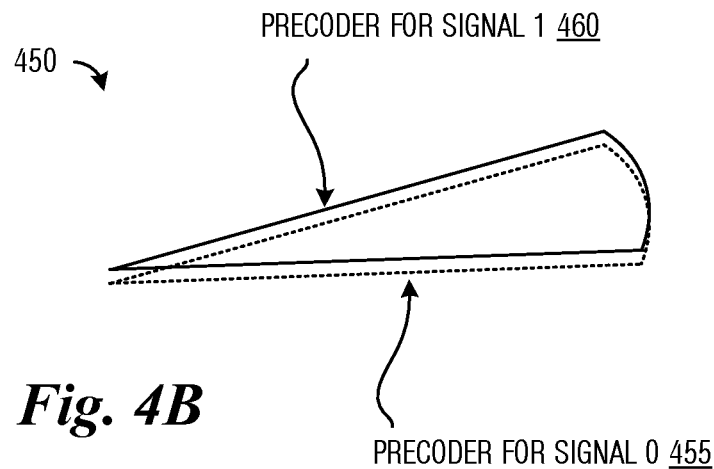
Fig. 4B
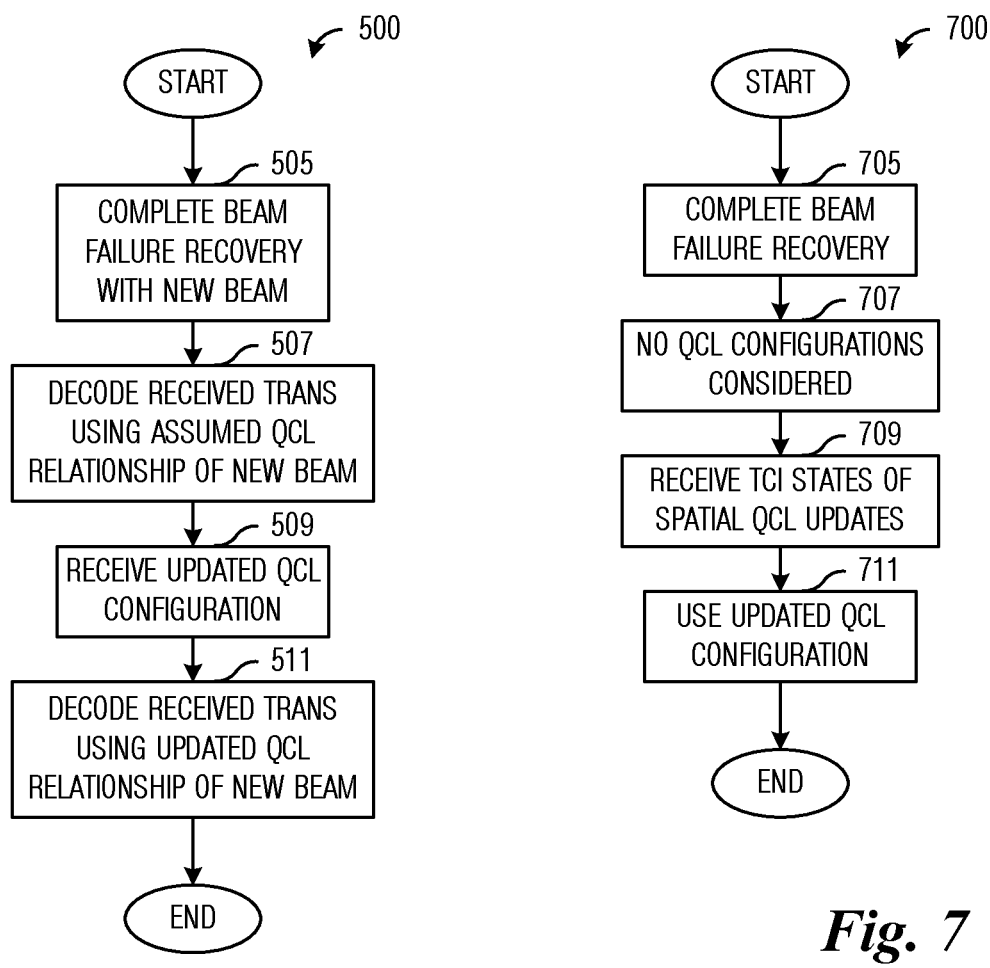
Fig. 5
Fig. 7

SYSTEM AND METHOD FOR INDICATING WIRELESS CHANNEL STATUS

This application is a divisional of U.S. patent application Ser. No. 15/987,220, filed on May 23, 2018, entitled "System and Method for Indicating Wireless Channel Status," now U.S. Pat. No. 11,743,879 issued on Aug. 29, 2023, which claims the benefit of U.S. Provisional Application No. 62/581,293, filed on Nov. 3, 2017, entitled "System and Method for Indicating Wireless Channel Status," applications of which are hereby incorporated herein by reference in their entireties.

TECHNICAL FIELD

The present disclosure relates generally to a system and method for digital communications, and, in particular embodiments, to a system and method for indicating wireless channel status.

BACKGROUND

One possible deployment scenario for fifth generation (5G) New Radio (NR) system architecture uses high frequency (HF) (6 gigahertz (GHz) and above, such as millimeter wavelength (mmWave)) operating frequencies to exploit greater available bandwidth and less interference then what is available at the congested lower frequencies. However, pathloss is a significant issue. Beamforming may be used to overcome the high pathloss.

Under certain conditions, a user equipment (UE) device may detect that all existing communications beam between an evolved NodeB (eNB) and the UE are not working as expected (i.e., there is a beam failure or loss) and there is a need to recover from this condition. However, a significant amount of channel status information is needed in order to fully maximize the performance a communications beam. The channel status information needs to be shared (sent or otherwise indicated or conveyed) between participating devices. Therefore, there is a need for mechanisms for indicating channel status information.

SUMMARY

Example embodiments provide a system and method for indicating wireless channel status.

In accordance with an example embodiment, a computer implemented method for operating a user equipment (UE) is provided. The method includes receiving, by the UE, a first frame on a first channel associated with a first beam identified during a beam failure recovery procedure, and determining, by the UE, that an assumed quasi-co-located relationship exists between the first channel and the first beam, and based thereon, decoding, by the UE, the first frame in accordance with a first reference signal on the first channel and using a first spatial domain receive filter that was used to decode the first beam.

Optionally, in any of the preceding embodiments, further includes receiving, by the UE after completion of the beam failure recovery procedure, an updated quasi-co-located relationship between the first channel and a second beam, receiving, by the UE, a second frame on the first channel associated with the second beam, and decoding, by the UE, the second frame in accordance with the first reference signal on the first channel and the updated quasi-co-located relationship between the first channel and the second beam that enables a second spatial domain receive filter that was used to decode the second beam to be used to decode the first channel.

Optionally, in any of the preceding embodiments, wherein the first beam and the second beam are the same.

Optionally, in any of the preceding embodiments, wherein the beam failure recovery procedure completes when a response to a beam failure recovery request is received.

Optionally, in any of the preceding embodiments, wherein the first channel is a physical downlink control channel (PDCCH), and wherein the method further comprises receiving, by the UE from an access node, a quasi-co-located relationship associated with the PDCCH.

Optionally, in any of the preceding embodiments, wherein the first channel is a physical downlink shared channel (PDSCH).

Optionally, in any of the preceding embodiments, further comprising receiving, by the UE from an access node, a mapping between transmission configuration indication (TCI) states and a TCI field of a control frame.

Optionally, in any of the preceding embodiments, further comprising receiving, by the UE from an access node, a third frame on a second channel, the third frame including scheduling information for the first frame.

Optionally, in any of the preceding embodiments, wherein decoding the first frame is further in accordance with a second reference signal conveyed on the second channel and an additional quasi-co-located relationship between the second channel and the first beam.

Optionally, in any of the preceding embodiments, wherein the second channel is a PDCCH.

In accordance with an example embodiment, a computer implemented method for operating a UE is provided. The method includes receiving, by the UE, a first data frame on a data channel associated with a first beam identified during a beam failure recovery procedure, and determining, by the UE, that an assumed quasi-co-located relationship exists between the data channel and a control channel, and based thereon, decoding, by the UE, the first data frame in accordance with a reference signal on a control channel and using a first spatial domain receive filter that was used to decode the control channel, wherein the control channel is also associated with the first beam.

Optionally, in any of the preceding embodiments, further includes receiving, by the UE after completion of the beam failure recovery procedure, an updated quasi-co-located relationship between the data channel and the control channel, receiving, by the UE, a second data frame on the data channel associated with a second beam, and decoding, by the UE, the second data frame in accordance with the reference signal on the control channel and the updated quasi-co-located relationship between the data channel and the control channel that enables a second spatial domain receive filter that was used to decode the control channel to be used to decode the data channel.

Optionally, in any of the preceding embodiments, wherein the first beam and the second beam are one and the same.

Optionally, in any of the preceding embodiments, wherein the updated quasi-co-located relationship is received as a TCI state.

Optionally, in any of the preceding embodiments, wherein the TCI state is received in a higher layer message.

Optionally, in any of the preceding embodiments, wherein the data channel is a PDSCH and the control channel is a PDCCH.

In accordance with an example embodiment, a UE is provided. The UE includes a memory storage comprising instructions, and one or more processors in communication with the memory storage. The one or more processors execute the instructions to receive a first frame on a first channel associated with a first beam identified during a beam failure recovery procedure, and determine that an assumed quasi-co-located relationship exists between the first channel and the first beam, and based thereon, decode the first frame in accordance with a first reference signal on the first channel and using a first spatial domain receive filter that was used to decode the first beam.

Optionally, in any of the preceding embodiments, wherein the one or more processors further execute the instructions to: receive, after completion of the beam failure recovery procedure, an updated quasi-co-located relationship between the first channel and a second beam, receive a second frame on the first channel associated with the second beam, and decode the second frame in accordance with the first reference signal on the first channel and the updated quasi-co-located relationship between the first channel and the second beam that enables a second spatial domain receive filter that was used to decode the second beam to be used to decode the first channel.

Optionally, in any of the preceding embodiments, wherein the first channel is a PDSCH, and wherein the one or more processors further execute the instructions to: receive, from an access node, a mapping between TCI states and a TCI field of a control frame.

Optionally, in any of the preceding embodiments, wherein the one or more processors further execute the instructions to: receive, from an access node, a third frame on a second channel, the third frame including scheduling information for the first frame.

In accordance with an example embodiment, a UE includes a memory storage comprising instructions, and one or more processors in communication with the memory storage. The one or more processors execute the instructions to receive a first data frame on a data channel associated with a first beam identified during a beam failure recovery procedure, and determine that an assumed quasi-co-located relationship exists between the data channel and a control channel, and based thereon, decode the first data frame in accordance with a reference signal on a control channel and using a first spatial domain receive filter that was used to decode the control channel, wherein the control channel is also associated with the first beam.

Optionally, in any of the preceding embodiments, wherein the one or more processors further execute the instructions to: receive, after completion of the beam failure recovery procedure, an updated quasi-co-located relationship between the data channel and the control channel, receive a second data frame on the data channel associated with a second beam, and decode the second data frame in accordance with the reference signal on the control channel and the updated quasi-co-located relationship between the data channel and the control channel that enables a second spatial domain receive filter that was used to decode the control channel to be used to decode the data channel.

Optionally, in any of the preceding embodiments, wherein the updated quasi-co-located relationship is received as a TCI state.

Practice of the foregoing embodiments enables a UE, after beam failure recovery, to determine which reference signal to use with data or control channels. The embodiments also help to reduce the signaling overhead associated with updating channel status information after beam failure recovery, thereby improving communications system performance.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 4B illustrates a graphical representation of two precoders that are spatially QCL'ed according to example embodiments described herein;

FIG. 5 illustrates a flow diagram of example operations occurring in a UE that has experienced beam failure while operating in a QCL environment and recovers from the beam failure and uses QCL configuration of a new beam according to example embodiments described herein;

FIG. 7 illustrates a flow diagram of example operations occurring in a UE that has experienced beam failure while operating in a QCL environment and recovers from the beam failure and does not use QCL configuration of a new beam according to example embodiments described herein;

DETAILED DESCRIPTION OF ILLUSTRATIVE EMBODIMENTS

The making and using of the disclosed embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

Figure 1:
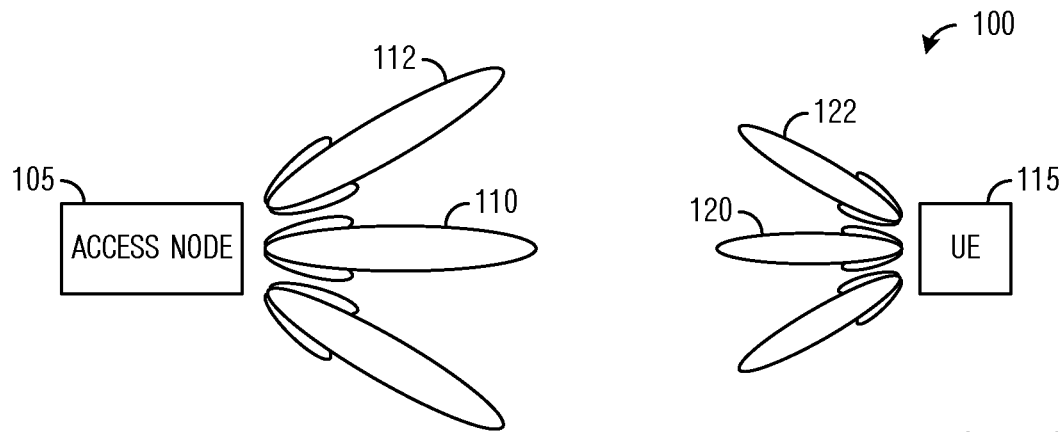
FIG. 1 illustrates an example wireless communications system according to example embodiments described herein.

FIG. 1 illustrates an example wireless communications system 100. Communications system wo includes an access node 105 serving a user equipment (UE) 115. In a first operating mode, communications to and from UE 115 pass through access node 105. In a second operating mode, communications to and from UE 115 do not pass through access node 105, however, access node 105 typically allocates resources used by UE 115 to communicate. Access nodes may also be commonly referred to as evolved NodeBs (eNBs), base stations, NodeBs, master eNBs (MeNBs), secondary eNBs (SeNBs), next generation (NG) NodeBs (gNBs), master gNBs (MgNBs), secondary gNBs (SgNBs), remote radio heads, access points, and the like, while UEs may also be commonly referred to as mobiles, mobile stations, terminals, subscribers, users, stations, and the like. A transmission point (TP) may be used to refer to any network entity capable of transmitting. Similarly, transmission-reception points (TRP) is a network entity that is capable of both transmitting and receiving, and commonly refer to access nodes, eNBs, gNBs, base stations, NodeBs, MeNBs, SeNBs, MgNBs, SgNBs, remote radio heads (RRHs), access points. In some situations, UEs (and similar devices) may also be operating as TRPs.

While it is understood that communications systems may employ multiple access nodes capable of communicating with a number of UEs, only one access node and one UE are illustrated for simplicity.

As discussed previously, pathloss in communications systems operating at high frequency (HF) (6 gigahertz (GHz) and above, such as millimeter wavelength (mm-Wave)) operating frequencies, is high, and beamforming may be used to overcome the high pathloss. As shown in FIG. 1, both access node 105 and UE 115 communicate using beamformed transmissions and receptions. As an example access node 105 communicates using a plurality of communications beams, including beams no and 112, while UE 115 communicates using a plurality of communications beams, including beams 120 and 122.

A beam may be a pre-defined set of beamforming weights in the context of codebook-based precoding or a dynamically defined set of beamforming weights in the context of non-codebook based precoding (e.g., Eigen-based beamforming (EBB)). A beam may also be a pre-defined set of phase shift preprocessors combining signals from the antenna array in the radio frequency (RF) domain. It should be appreciated that a UE may rely on codebook-based precoding to transmit uplink signals and receive downlink signals, while a TRP may rely on non-codebook based precoding to form certain radiation patterns to transmit downlink signals or receive uplink signals.

Figure 2:
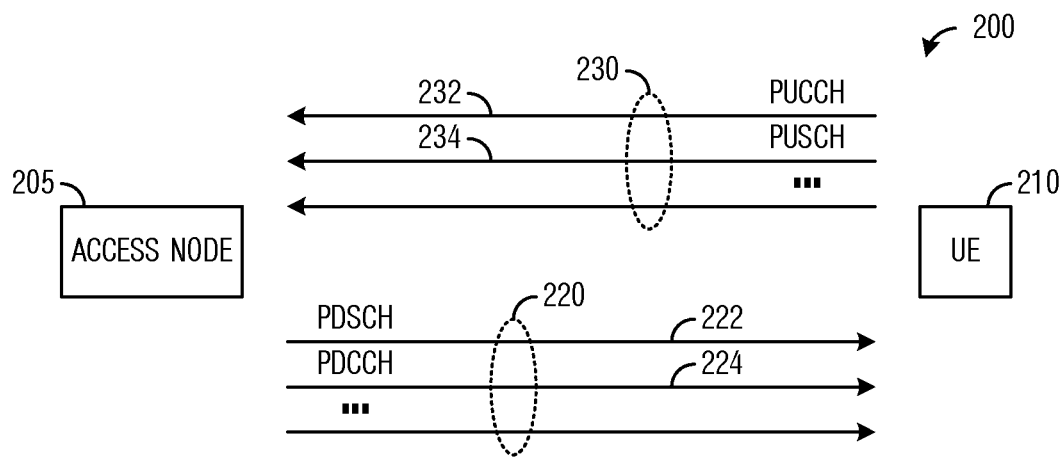
FIG. 2 illustrates a communications system highlighting an example channel structure between an access node 205 and a UE according to example embodiments described herein.

FIG. 2 illustrates a communications system 200 highlighting an example channel structure between an access node 205 and a UE 210. In a bi-directional communications implementation, there is a downlink channel 220 and an uplink channel 230 between access node 205 and UE 210. Downlink channel 220 and uplink channel 230 may each include a plurality of unidirectional channels. As shown in FIG. 2, downlink channel 220 includes a physical downlink shared channel (PDSCH) 222 and a physical downlink control channel (PDCCH) 224 among others, while uplink channel 230 includes a physical uplink control channel (PUCCH) 232 and a physical uplink shared channel (PUSCH) 234 among others.

Figure 3:
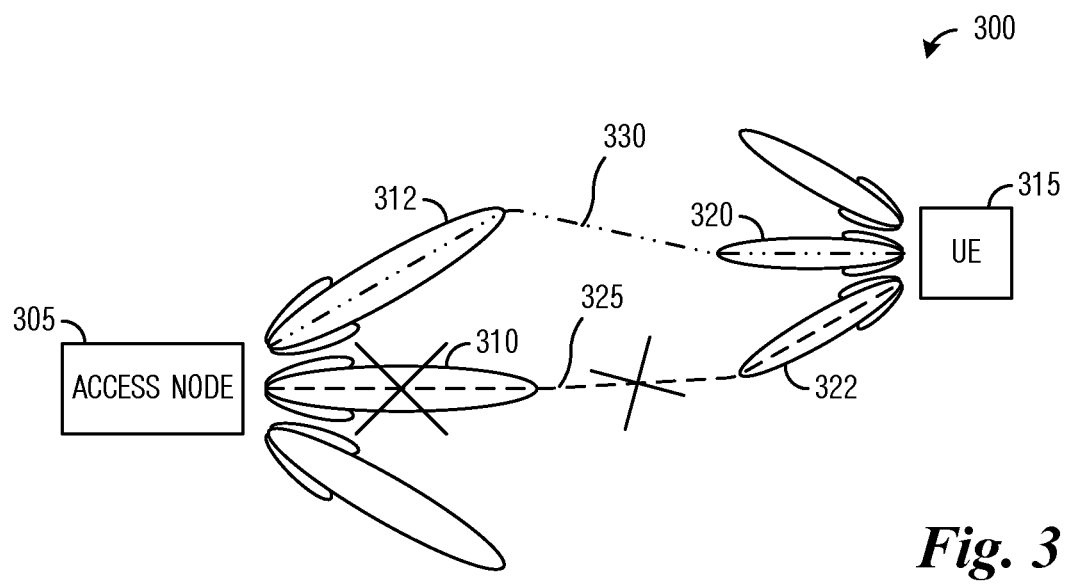
FIG. 3 illustrates a wireless communications system highlighting beam failure and beam failure recovery according to example embodiments described herein.

FIG. 3 illustrates a wireless communications system 300 highlighting beam failure and beam failure recovery. Communications system 300 includes an access node 305 serving a UE 315. As shown in FIG. 3, both access node 305 and UE 315 communicate using beamformed transmissions and receptions. As an example access node 305 communicates using a plurality of communications beams, including beams 310 and 312, while UE 315 communicates using a plurality of communications beams, including beams 320 and 322.

Initially, access node 305 and UE 315 are communicating through beam pair link (BPL) 325, which comprises beams 310 and 322. However, due to blockage or UE mobility, BPL 325 fails. UE 315 detects a candidate beam 312 from access node 305 to replace failed beam 310, for example. UE 315 initiates beam failure recovery by sending a beam failure recovery request (BFRQ) to access node 305. Upon completion of the beam failure recovery, BPL 330 is established (comprising beams 312 and 320).

When two or more reference signals, data signals or resources are related in such a way that the two or more reference signals, data signals or resources may be viewed as possessing similar characteristics, they are said to possess a quasi co-located (QCL) relationship. QCL relationships may refer to time, frequency, code, or spatial relationships between two or more reference signals, data signals, or resources, while spatial QCL refers to only spatial relationships between two or more reference signals, data signals, or resources. The spatial QCL information may include associations between signals and resources, such as CSI-RS resources and wideband reference signals (WBRS), or associations between individual WBRSs, or associations between CSI-RS resources and beamformed random access channels (BRACHs). As an example, in a one to one association, each CSI-RS signal is associated with one WBRS such that the transmit precoder for the CSI-RS signal is the same as a transmit precoder for the WBRS. As another example, each CSI-RS signal is associated with one WBRS such that the transmit precoder for the CSI-RS signal is the same as a transmit precoder for the WBRS. As another example, a first WBRS is associated with a second WBRS such that the transmit precoder for the second WBRS is the same as that for the first WBRS. It is possible that multiple CSI-RS signals are associated with a single WBRS, and vice versa. The spatial QCL information may be stored in tabular form or in a memory of a device. The spatial QCL information includes associations between CSI-RS and WBRSs. The spatial QCL information may be used by the UE to determine CSI-RS beam indices from WBRS beam indices, and vice versa, for example. As an example, in a one-to-one association, each CSI-RS signal is associated with one WBRS. It is possible that multiple CSI-RS signals are associated with a single WBRS, and vice versa.

Figure 4A:
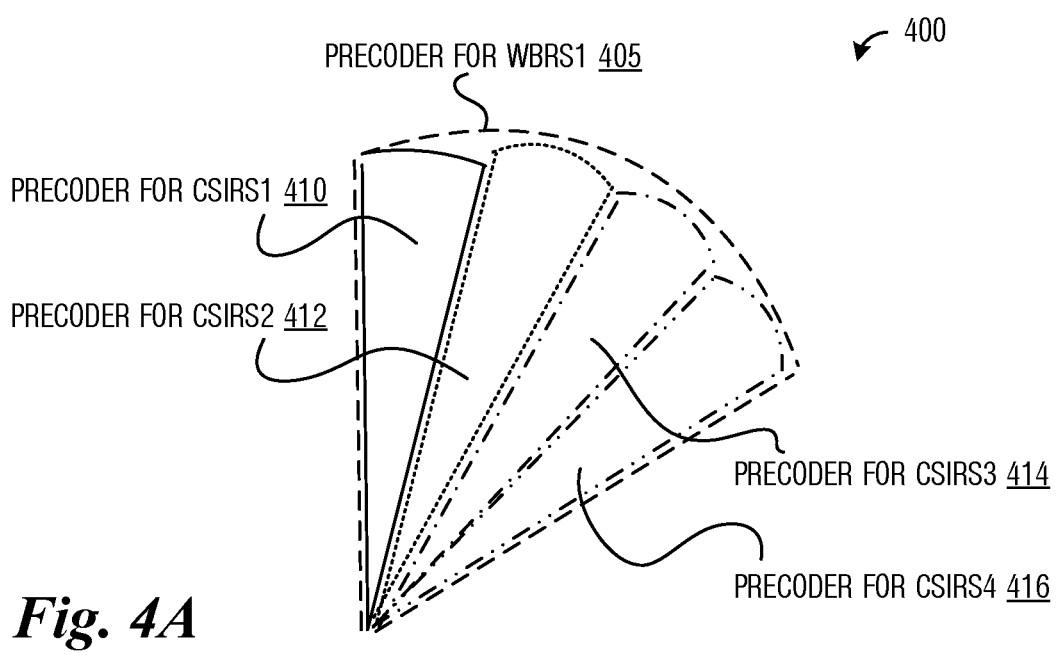
FIG. 4A illustrates a diagram of example beams for WBRS and CSI-RS according to example embodiments described herein.

FIG. 4A illustrates a diagram 400 of example beams for WBRS and CSI-RS. As shown in FIG. 4A, a precoder for an example WBRS has beam footprint 405, while precoders for example CSI-RS1, CSI-RS2, CSI-RS3, and CSI-RS4 have beam footprints 410, 412, 414, and 416, respectively.

FIG. 4B illustrates a graphical representation 450 of two precoders that are spatially QCL'ed. A first beam pattern 455 represents a precoder for a first signal and a second beam pattern 460 represents a precoder for a second signal. The beam patterns overlap because the two precoders are identical (or substantially identical).

At the Third Generation Partnership Project (3GPP) RAN1 AdHoc NR #3 meeting, mechanisms for sharing QCL information of downlink physical channels were discussed. Some agreements were made, including:

A UE is configured using radio resource control (RRC) messaging with a list of up to M candidate transmission configuration indication (TCI) states at least for the purposes of sharing QCL information;
Whether M is equal to or larger than $2^N$ is for further study, where N is the size of a downlink control information (DCI) field for PDSCH;
Mapping between the candidate TCI states to states described by N bit DCI field PDSCH is for further study;
Each TCI state may be configured with at least one reference signal (RS) set;
Each identifier (ID), with details of the ID for further study, for downlink RS at least for the purpose of spatial QCL in an RS set may refer to one of the following downlink RS types: synchronization signal block (SSB), periodic channel state information reference signal (CSI-RS), aperiodic CSI-RS, or semi-persistent CSI-RS;
Other RS, such as tracking reference signal (TRS), phase-tracking reference signal (PTRS), in an RS set depending on an outcome of discussions of QCL agenda item;
Mechanisms to initialize or update the ID of a downlink RS or RSs in the RS set used for (at least) spatial QCL purposes are for further study
At least the two following mechanisms are for further study, (1) explicit signaling to the UE of the downlink RS(s) ID and corresponding TCI state, and (2) implicit association of the downlink RS(s) ID to a TCI state based on measurements by the UE;
Mechanisms used for different RS types are for further study;
Whether or not a TCI state includes other parameter(s), e.g., for PDSCH rate matching purposes, are for further study; and Value of N, where N is at most three bits, is for further study. It is noted that additional details on the specification of more than one demodulation reference signal (DMRS) port group and more than one RS set per TCI is to be completed.

Also agreed were:
The QCL configuration for PDCCH contains the information that provides a reference to a TCI state, with
Alternate 1: the QCL configuration or representation thereof is on a per CORESET basis, with the UE applying the QCL assumption to the associated CORESET monitoring occasions. All search space(s) within the CORESET utilize the same QCL;
Alternate 2: The QCL configuration or representation thereof is on a per search space basis, with the UE applying the QCL assumption on an associated search space. Potentially meaning that in a situation where there are multiple search spaces with a CORESET, the UE may be configured with different QCL assumptions for different search spaces; It is noted that the sharing of QCL configuration is performed using RRC or RRC and medium access control (MAC) control element (CE). Sharing of QCL configuration by DCI is for further study. It is also noted that the above assumptions are provided as input to the control channel discussion.

Also agreed were:
For sharing of QCL configuration of the PDSCH:
When TCI states are used for sharing of QCL configuration, the UE receives an N-bit TCI field in DCI,
The UE assumes that the PDSCH DMRS is QCL with the downlink RS(s) in the RS set corresponding to the signaled TCI state. For further study, whether or not a QCL type is configured, and configuration details.
Whether or not the TCI field is always present in a given downlink-related DCI is for further study;
Whether or not the TCI field is in the same DCI as that containing the PDSCH scheduling assignment is for further study;
For further study, timing between when the UE receives a QCL configuration or representation thereof and a first time that the QCL assumption may be applied for demodulation of PDSCH or PDCCH.

At the 3GPP RAN1 #90bis meeting, mechanisms on sharing of QCL configuration for downlink physical channels were discussed, and the following agreements were made:
Initialization or update of the identifier of a downlink RS(s) in the RS set used at least for spatial QCL purposes is performed at least via explicit signaling. Explicit signaling using RRC or RRC+MAC CE are supported.
Implicit update via an implicit association of the downlink RS ID(s) to a TCI state based on measurements by a UE are for further study.

Also agreed were:
In the situation when at least spatial QCL is configured or conveyed, higher layer UE-specific configuration of whether or not the TCI field is present in downlink-related DCI is supported.
If the TCI field is not present, no dynamic conveyance of QCL parameters for PDSCH is provided in downlink-related DCI. For PDSCH, a UE applies higher-layer signaling of QCL parameters or representation thereof for determining QCL parameters (details are for further study) except for the situation of beam management without beam-related information where no spatial QCL parameters are configured using higher layer signaling.

If the TCI field is present,

The TCI field is always present in the associated DCI for PDSCH scheduling, irrespective of same-slot scheduling or cross-slot scheduling.

If the scheduling offset is less than a threshold K, PDSCH uses a pre-configured, pre-defined, or rule-based spatial assumption (details are for further study). Also for further study, the other QCL parameters are still obtained from the N-bit TCI state field of the DCI, and how to update pre-configured or pre-defined spatial assumption (if applicable). The threshold K may be based on UE capability only if multiple candidate values of K are supported.

If the scheduling offset is greater than or equal to a threshold K, PDSCH uses the beam (a spatial QCL parameter) conveyed by the N-bit TCI field in the assignment DCI.

The proposed candidate solutions should consider below and above 6 GHz downlink beam related operation with and without beam information or downlink beam management with and without beam information.

It is noted this does not apply to the situation of beam management without beam-related information.

Example operations based on the 3GPP RAN1 AdHoc NR #3 meeting and the 3GPP RAN1 #90bis meeting agreement include:

An access node maintains a list of up to M candidate TCI states at least for the purposes of sharing of QCL configuration and configures it to a UE. Each TCI state can be configured for one RS set;

Out of the up to M candidate TCI states, up to $2^N$ states are mapped to an N bit DCI for PDSCH, with M being equal to or greater than $2^N$;

For a PDSCH transmission, the access node conveys information about a downlink RS(s) that is QCL'ed with the DMRS of the PDSCH by TCI state in the DCI of a PDCCH that schedules the PDSCH.

It is noted that as used in the discussion presented herein, the term QCL may generally refer to both QCL and spatial QCL. In circumstances where such usage would lead to confusion, spatial QCL will be used as needed.

However, when a beam failure occurs, the channel quality of currently used beams is significantly deteriorated. Hence, it is highly likely that the channel quality of downlink RSs configured in TCI states are also deteriorated, and thus, no downlink RSs in the TCI states may be used for the conveying of the QCL configuration of PDCCH or PDSCH. Therefore, once a beam failure occurs, there is no proper way for conveying the QCL configuration for PDCCH or PDSCH after beam failure recovery until there is an update of the ID of a downlink RS(s) in the RS set used at least for spatial QCL purposes is completed.

As related to the conveying of the QCL configuration for PDCCH, the conveying of the QCL configuration is performed using RRC or RRC and MAC CE. Potential scenarios include:

A first downlink RS (such as a synchronization signal block; a periodic, aperiodic, or semi-persistent CSI-RS; and so on) is configured to be QCL'ed with a DMRS for PDCCH for a UE, and is used as a current beam;

A beam failure occurs such that the channel quality of the first downlink RS is severely deteriorated;

A second downlink RS is selected as a new beam during a beam failure recovery procedure;

After beam failure recovery and before RRC or RRC and MAC CE signaling that the second downlink RS is configured to be QCL'ed with the DMRS for PDCCH, the UE considers the first downlink RS to be QCL'ed with the DMRS for PDCCH, whose channel quality is too poor to be used.

As related to the conveying of the QCL configuration for PDSCH, the TCI states and their mapping to DCI is RRC configured, and a TCI field is present in a DCI of a PDCCH that schedules a PDSCH. Potential scenarios include:

An access node configures a first downlink RS (such as a synchronization signal block; a periodic, aperiodic, or semi-persistent CSI-RS; and so on) to be QCL'ed with a DMRS for PDSCH for a UE, and the first downlink RS is used as a current beam;

A beam failure occurs such that the channel quality of the first downlink RS is severely deteriorated;

A second downlink RS is selected as a new beam during a beam failure recovery procedure, but the second downlink RS is not listed in the TCI states;

After beam failure recovery and before the second downlink RS is listed as one of the TCI states and mapped to the TCI field in the DCI, the access node cannot convey information about the second downlink RS in the TCI field of the DCI as a QCL configuration for PDSCH.

According to an example embodiment, techniques for operating in a QCL environment after beam failure recovery but prior to TCI states related to spatial QCL purposes updates are complete are provided. Utilizing QCL information after beam failure recovery but before TCI states related to spatial QCL purposes are updated may lead to degraded performance due to outdated or incorrect QCL information.

According to a first example embodiment, after beam failure recovery, a selected new beam is used for the QCL configuration for PDCCH or PDSCH. In other words, the QCL configuration associated with the selected new beam is used by the UE. The QCL configuration associated with the selected new beam may be used by the UE until updates to TCI states are received, for example.

FIG. 5 illustrates a flow diagram of example operations 500 occurring in a UE that has experienced beam failure while operating in a QCL environment and recovers from the beam failure and uses QCL configuration of a new beam. Operations 500 may be indicative of operations occurring in a UE as the UE experiences beam failure while operating in a QCL environment and recovers from the beam failure and uses QCL configuration of a new beam selected during beam failure recovery.

Operations 500 begin with the UE completing beam failure recovery (block 505). Completion of the beam failure recovery includes the reception of a response to the BFRQ sent by the UE to initiate beam failure recovery. The response to the BFRQ implicitly includes information related to a new beam selected to replace the beam that failed. As an example, the response to the BFRQ has a QCL relationship with the selected new beam, and hence, the UE is able to infer information about the selected new beam from the response to the BFRQ and its QCL relationship with the selected new beam. Alternatively, the response to the BFRQ explicitly includes information related to the new beam selected to replace the beam that failed. Hence, the UE is able to obtain information about the selected new beam directly from the response to the BFRQ. The UE decodes any received transmissions by using an assumed (or inferred) QCL relationship between the selected new beam and a downlink RS of PDCCH or PDSCH (block 507). In other words, the UE decodes a received transmission by assuming (or inferring) that there exists a QCL relationship between the selected new beam and a downlink RS, such as a DMRS, of a PDCCH or PDSCH, before any updated QCL configuration is received. For example, the UE uses the same spatial domain receive filter for receiving and decoding the DMRS of the PDCCH or PDSCH as for receiving and decoding the selected new beam. The UE continues to use the assumed QCL relationship until an update is received. In general, an update is received some time after the completion of the beam failure recovery process, and until the update is received, the UE uses the assumed QCL relationship to receive and decode received transmissions. The UE receives an updated QCL configuration (block 509). After the completion of the beam failure recovery process, updates to the QCL configuration are signaled, by the access node, for example. The UE uses the updated QCL configuration as the QCL configuration of the PDCCH or PDSCH to decode received transmissions (block 511). It is noted that the updated QCL configuration may specify a QCL relationship that is different from the assumed QCL relationship. As an example, the updated QCL configuration may specify a beam, that is different from the selected new beam, having a QCL relationship with the downlink RS. As another example, the updated QCL configuration may specify more than one beam, with one beam being the selected new beam and one or more other beams, having a QCL relationship with the downlink RS.

As an illustrative example, after beam failure recovery, a QCL relationship is assumed between the selected new beam and a downlink RS of a PDCCH or PDSCH. A TCI table is updated to include the selected new beam. If a TCI field is present in the DCI, a mapping between TCI states and the TCI field in the DCI is updated in such a way that the TCI field conveys information about the selected new beam. As another illustrative example, after beam failure recovery, the UE assumes that, for decoding data transmissions, the QCL relationship between control transmissions on the PDCCH and a RS of the PDCCH also applies to data transmissions on the PDSCH and a RS of the PDSCH until an update to the TCI states is received.

In a first embodiment of the first example embodiment, a beam failure detection, a beam failure recovery, and a decoding of a frame on a PDCCH process may be as follows:

A UE receives a first information from an access node related to a QCL configuration for PDCCH, wherein the QCL configuration for PDCCH includes a second information that a first RS is spatially QCL'ed with a DMRS of PDCCH;

The UE detects a beam failure;

The UE identifies a second RS as a new beam for beam failure recovery;

The UE sends a BFRQ to the access node;

The UE receives a beam failure recovery response (BFRP) from the access node;

The UE receives a frame on a PDCCH, after beam failure recovery;

The UE decodes the frame by assuming that a DMRS of the PDCCH is QCL'ed (i.e., has a QCL relationship) with the second RS.

It is noted that the first RS may be from a first set of TCI states. It is noted that the first information may be shared by RRC or RRC and MAC CE signaling. It is noted that the BFRQ may carry information related to the second RS. It is noted that the BFRP may carry information related to the second RS. It is noted that the UE may decode the BFRP by assuming that a DMRS of the PDCCH is QCL'ed with the second RS. It is noted that the PDCCH may carry a TCI field and the TCI field may be set to a predetermined value. The predetermined value may be set to zero. The predetermined value may be set to a maximum value that the TCI field is capable of representing, e.g., seven if the TCI field is three bits long, three if the TCI field is two bits long, etc. The predetermined value may be set to a value that no specific RS is mapped to in the TCI field. As an example, if the length of the TCI field is 2 bits long, implying that there are 4 states that the TCI field is capable of representing. If there are only 2 states mapped to the TCI field, e.g., state 0 and state 1, then states 2 and 3 may be the predetermined values.

The beam failure detection, beam failure recovery, and decoding of a frame on a PDCCH process may also include:

The UE receiving signaling that updates a QCL configuration for PDCCH, where the QCL configuration for PDCCH includes information that a third RS is spatially QCL'ed with a DMRS of PDCCH;

The UE receives a second frame on PDCCH, after beam failure recovery;

The UE decodes the second frame by assuming that a DMRS of the PDCCH is QCL'ed with the third RS from a second set of TCI states.

It is noted that the second RS may be from the second set of TCI states. It is also noted that the third RS and the second RS may be one and the same.

Figure 6A:
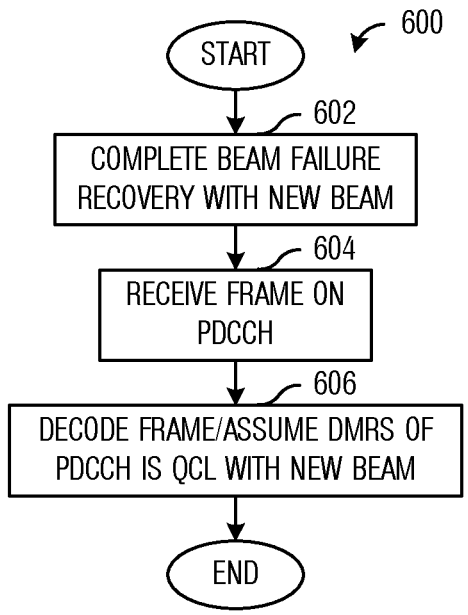
FIG. 6A illustrates a flow diagram of example operations occurring in a UE participating in a beam failure detection, a beam failure recovery, and a decoding of a frame on a PDCCH according to example embodiments described herein.

FIG. 6A illustrates a flow diagram of example operations 600 occurring in a UE participating in a beam failure detection, a beam failure recovery, and a decoding of a frame on a PDCCH.

Operations 600 begin with the UE completing a beam failure recovery procedure (block 602). Part of the beam failure recovery procedure includes the UE selecting a new beam or receiving information about the new beam. The UE receives a frame on a PDCCH (block 604). The UE decodes the frame (block 606). The UE decodes the frame by assuming that a DMRS of the PDCCH is QCL'ed with the new beam, for example.

In a second embodiment of the first example embodiment, a beam failure detection, a beam failure recovery, and a decoding of a frame on a PDSCH process, where a TCI field is included in a DCI that schedules the PDSCH, may be as follows:

A UE receives an information from an access node regarding a mapping between TCI states and the TCI field in the DCI;

The UE detects a beam failure;

The UE identifies a first RS as a new beam for beam failure recovery;

The UE sends a BFRQ to the access node;

The UE receives a BFRP from the access node;

The UE receives a first data frame on PDSCH;

The UE decodes the first data frame by assuming that a DMRS of the PDSCH is QCL'ed with the first RS.

It is noted that the UE may further receive a DCI that schedules the first data frame, where the DCI carries a TCI field and the TCI field is set to a predetermined value. The predetermined value may be set to zero. The predetermined value may be set to a maximum value that the TCI field is capable of representing, e.g., seven if the TCI field is three bits long, three if the TCI field is two bits long, etc. The predetermined value may be set to a value that no specific RS is mapped to in the TCI field. As an example, if the length of the TCI field is 2 bits long, implying that there are 4 states that the TCI field is capable of representing. If there are only 2 states mapped to the TCI field, e.g., state 0 and state 1, then states 2 and 3 may be the predetermined values.

It is noted that the UE may decode the BFRP by assuming that a DMRS of a PDCCH is QCL'ed with the first RS, the PDCCH carrying the BFRP, for example. It is noted that the BFRP may carry a TCI field and that the TCI field is set to a first value. The UE may assign the first RS for a RS for spatial QCL configuration corresponding to the first value of the TCI field. It is noted that the UE may further receive a DCI that schedules the first data frame, where the DCI carries a TCI field and the TCI field is set to the first value. It is noted that the TCI field in the DCI that schedules the first data frame may reassign the first RS. In such a situation, the TCI field in the DCI is set to a first value and the UE may assign the first RS as a RS for spatial QCL configuration corresponding to the first value of the TCI field.

In an additional second embodiment of the first example embodiment, a beam failure detection, a beam failure recovery, and a decoding of a frame on a PDSCH process, where a TCI field is included in a DCI that schedules the PDSCH, may be as follows:

A UE receives an information from an access node regarding a mapping between TCI states and the TCI field in the DCI;

The UE detects a beam failure;

The UE identifies a first RS as a new beam for beam failure recovery;

The UE sends a BFRQ to the access node;

The UE receives a BFRP from the access node;

The UE receives a first control frame that schedules a first data frame, where the first control frame is carried on a PDCCH and the first data frame is carried on a PDSCH;

The UE decodes the first data frame by assuming that a DMRS of the PDSCH is QCL'ed with a RS that a DMRS of the PDCCH is QCL'ed with.

It is noted that the DMRS of the PDSCH may be QCL'ed with the DMRS of the PDCCH.

In a third embodiment of the first example embodiment, a beam failure detection, a beam failure recovery, and a decoding of a frame on a PDSCH process, where a TCI field is not included in a DCI that schedules the PDSCH, may be as follows:

A UE determines a first RS that is QCL'ed with a DMRS for PDSCH decoding;

The UE detects a beam failure;

The UE identifies a second RS as a new beam for beam failure recovery;

The UE sends a BFRQ to the access node;

The UE receives a BFRP from the access node;

The UE receives a first data frame on PDSCH;

The UE decodes the first data frame by assuming that a DMRS of the PDSCH is QCL'ed with the second RS.

Figure 6B:
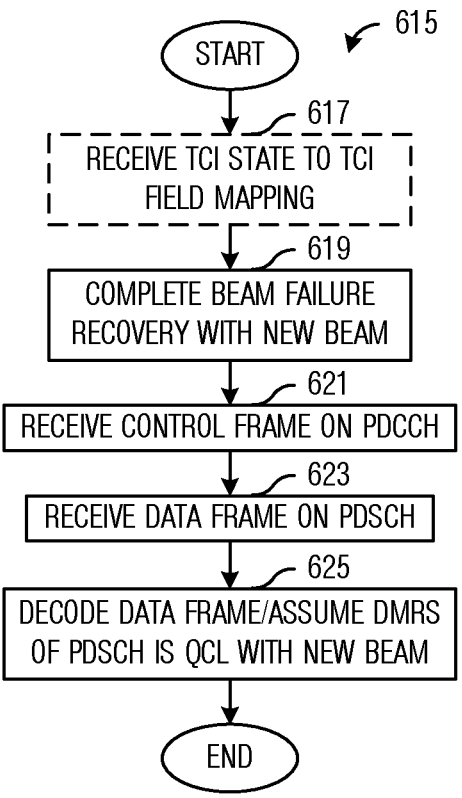
FIG. 6B illustrates a flow diagram of example operations occurring in a UE participating in a beam failure detection, a beam failure recovery, and a decoding of a frame, where a TCI field is or is not included in a DCI that schedules a PDSCH according to example embodiments described herein.

FIG. 6B illustrates a flow diagram of example operations 615 occurring in a UE participating in a beam failure detection, a beam failure recovery, and a decoding of a frame, where a TCI field is or is not included in a DCI that schedules a PDSCH.

Operations 615 begin with the UE optionally receiving information regarding a mapping between TCI states and a TCI field in a DCI (block 617). The UE completes a beam failure recovery procedure (block 619). Part of the beam failure recovery procedure includes the UE selecting a new beam or receiving information about the new beam. The UE may receive a control frame on a PDCCH (block 621). The UE receives a data frame on a PDSCH (block 623). The UE decodes the data frame (block 625). The UE decodes the data frame by assuming that a DMRS of the PDSCH is QCL'ed with the new beam, for example. The UE decodes the data frame by assuming that a DMRS of the PDSCH is QCL'ed with a RS that a DMRS of the PDCCH is QCL'ed with, for example.

In an additional third embodiment of the first example embodiment, a beam failure detection, a beam failure recovery, and a decoding of a frame on a PDSCH process, may be as follows:

The UE detects a beam failure;

The UE identifies a first RS as a new beam for beam failure recovery;

The UE sends a BFRQ to the access node;

The UE receives a BFRP from the access node, where the BFRP schedules a first data frame transmission on a PDSCH;

The UE decodes the first data frame by assuming that a DMRS of the PDSCH is QCL'ed with the first RS.

It is noted that the BFRP may carry a TCI field that is set to a first value, and that the UE assumes the first RS as the RS for QCL configuration corresponding to the first value of the TCI field. It is noted that the BRFP may carry a TCI field that is set to a predetermined value and that the predetermined value may be set to one of a variety of predetermined values, such as zero, a maximum value, not assigned, and so forth. It is noted that the DMRS of the BFRP and the PDSCH may be QCL'ed with the same RS.

In a fourth embodiment of the first example embodiment, a TCI state update procedure may be as follows:

An access node maintains a TCI table that includes a first group of states where each of the states represents a RS that may be used for spatial QCL configuration;

The access node receives a BFRQ from a UE;

The access node identifies a first RS as a new beam for beam failure recovery with the UE;

The access node sends a BFRP to the UE;

The access node updates the TCI table, where the updated TCI table includes a second group of states where each of the states represents a RS that may be used for spatial QCL configuration, and one state from the second group of states corresponds to the first RS.

It is noted that the number of states in the second group of states may be one. It is noted that none of the states in the first group of states may correspond to the first RS. It is noted that the access node may further update a mapping between TCI states and the TCI field in the DCI, where a third group of states from the second group of states is mapped to each value of the TCI field in the DCI, and one state from the third group of states corresponds to the first RS. The value of the TCI field in the DCI that corresponds to the first RS may be set to zero.

Figure 6C:
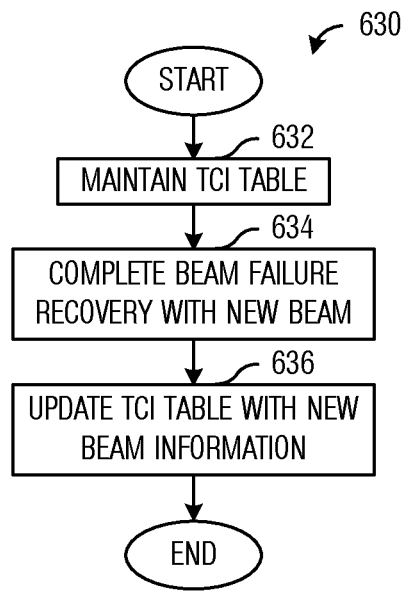
FIG. 6C illustrates a flow diagram of example operations occurring in an access node updating TCI states according to example embodiments described herein.

FIG. 6C illustrates a flow diagram of example operations 630 occurring in an access node updating TCI states.

Operations 630 begin with the access node maintaining a TCI table (block 632). The TCI table includes a first group of states, where each state represents a RS that may be used for spatial QCL configuration, for example. The access node completes beam failure recovery procedure (block 634). Part of the beam failure recovery procedure may include the access node identifying a first RS as a new beam for the beam failure recovery procedure. The access node updates the TCI table (block 636). The updated TCI table includes a second group of states where each of the states represents a RS that may be used for spatial QCL configuration, and one state from the second group of states corresponds to the first RS (the new beam), for example.

In a fifth embodiment of the first example embodiment, a DCI selection procedure, where a TCI field is present prior to beam failure but is not present after beam failure, may be as follows:
- A UE is configured that a TCI field is present in a downlink-related DCI;
- The UE detects a beam failure;
- The UE identifies a first RS as a new beam for beam failure recovery;
- The UE sends a BFRQ to the access node;
- The UE receives a BFRP from the access node;—With beam recovery successful, the UE assumes that the TCI field is not present in the downlink-related DCI until the UE receives a QCL configuration from the access node.

It is noted that the UE may further receive a first data frame on a PDSCH. The UE may decode the first data frame by assuming that a DMRS of the PDSCH is QCL'ed with the first RS.

Figure 6D:
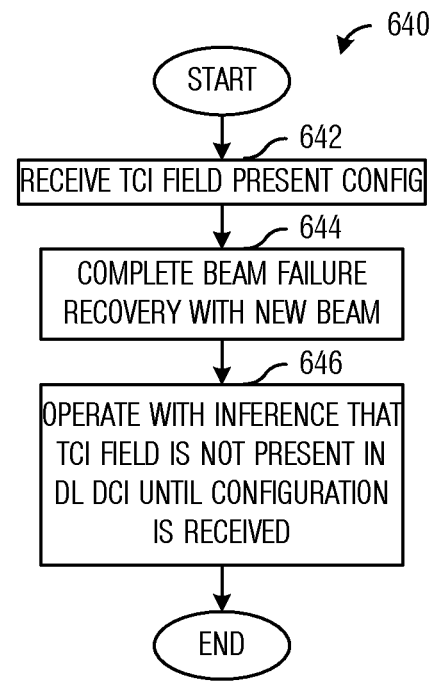
FIG. 6D illustrates a flow diagram of example operations occurring in a UE participating in a DCI selection procedure, where a TCI field is present in the DCI prior to beam failure but is not present in the DCI after beam failure according to example embodiments described herein.

FIG. 6D illustrates a flow diagram of example operations 640 occurring in a UE participating in a DCI selection procedure, where a TCI field is present in the DCI prior to beam failure but is not present in the DCI after beam failure.

Operations 640 begin with the UE being configured that a TCI field is present in downlink-related DCI (block 642). The UE completes beam failure recovery procedure (block 644). Part of the beam failure recovery procedure includes the UE selecting a new beam or receiving information about the new beam. The UE operates under an assumption that the TCI field is not present in downlink-related DCI until QCL configuration is received from an access node (block 646).

In a sixth embodiment of the first example embodiment, a DCI selection procedure, where a TCI field is not present prior to beam failure but is present after beam failure, may be as follows:
- A UE is configured that a TCI field is not present in a downlink-related DCI;
- The UE detects a beam failure;
- The UE identifies a first RS as a new beam for beam failure recovery;
- The UE sends a BFRQ to the access node;
- The UE receives a BFRP from the access node;—With beam recovery successful, the UE assumes that the TCI field is present in the downlink-related DCI until the UE receives a QCL configuration from the access node.

It is noted that the UE may further receive information from the access node regarding a mapping between TCI states and the TCI field in the DCI before the beam failure occurs. After the beam failure occurs, the UE may receive a first DCI that schedules a first data frame on a first PDSCH, where the first DCI includes a TCI field set to a first value. The UE may decode the first data frame by assuming that a DMRS of the PDSCH is QCL'ed with the first RS. It is noted that the UE may assign the first RS for a RS for spatial QCL configuration corresponding to the first value of the TCI field.

Figure 6E:
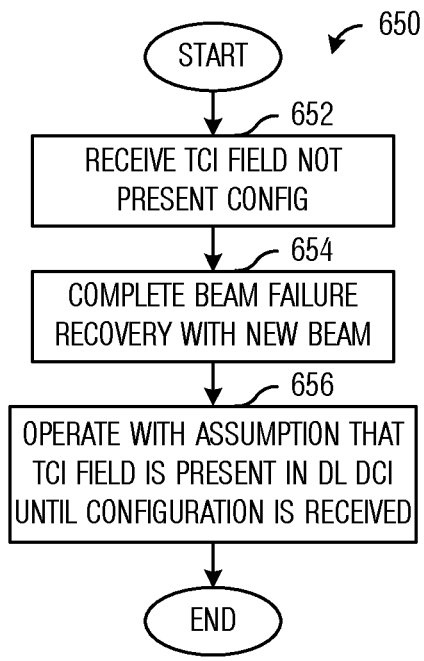
FIG. 6E illustrates a flow diagram of example operations occurring in a UE participating in a DCI selection procedure, where a TCI field is not present in the DCI prior to beam failure but is present in the DCI after beam failure according to example embodiments described herein.

FIG. 6E illustrates a flow diagram of example operations 650 occurring in a UE participating in a DCI selection procedure, where a TCI field is not present in the DCI prior to beam failure but is present in the DCI after beam failure.

Operations 650 begin with the UE being configured that a TCI field is not present in downlink-related DCI (block 652). The UE completes beam failure recovery procedure (block 654). Part of the beam failure recovery procedure includes the UE selecting a new beam or receiving information about the new beam. The UE operates under an assumption that the TCI field is present in downlink-related DCI until a QCL configuration is received from an access node (block 656).

According to a second example embodiment, after beam failure recovery, no QCL configuration is considered until TCI states related to spatial QCL purposes are updated. In other words, the UE uses only RSs associated with PDCCH or PDSCH for detection or decoding purposes. The UE uses a DMRS associated with PDCCH or PDSCH for detection or decoding purposes until updates to TCI states are received, for example.

FIG. 7 illustrates a flow diagram of example operations 700 occurring in a UE that has experienced beam failure while operating in a QCL environment and recovers from the beam failure and does not use QCL configuration of a new beam. Operations 700 may be indicative of operations occurring in a UE as the UE experiences beam failure while operating in a QCL environment and recovers from the beam failure and does not use QCL configuration of a new beam selected during beam failure recovery.

Operations 700 begin with the UE completing beam failure recovery (block 705). After completing beam failure recovery, the UE may assume that there is no downlink RS configured for QCL relation for PDCCH or PDSCH (block 707). Hence, when the UE receives a PDCCH or PDSCH, the UE may only use a DMRS of the PDCCH or PDSCH for detection or decoding of the PDCCH or PDSCH. The UE receives updates to TCI states related to spatial QCL purposes (block 709). The UE uses the updated QCL configuration for subsequent for subsequent PDCCH or PDSCH detection or decoding (block 711). As an example, the UE detects or decodes a PDCCH or PDSCH by assuming that a DMRS of the PDCCH or PDSCH is QCL'ed with a new beam selected in beam failure recovery and uses the new beam (or a RS carried on the new beam) to assist in the decoding.

As an illustrative example, after beam failure recovery completes, the UE assumes that there is no downlink RS configured for QCL relation for PDCCH or PDSCH. Therefore, when the UE receives a PDCCH or PDSCH, the UE may only rely upon a DMRS of the PDCCH or PDSCH for detection or decoding of the PDCCH or PDSCH. When the TCI states related to spatial QCL are updated, the UE may resume using QCL configuration based on downlink signaling.

In a first embodiment of the second example embodiment, a PDCCH frame decoding process may be as follows:
- A UE receives a first information from an access node regarding a QCL configuration for PDCCH, where the QCL configuration for PDCCH includes a second information that a first RS is spatially QCL'ed with a DMRS of PDCCH;
- The UE detects a beam failure;
- The UE sends a BFRQ to the access node;
- The UE receives a BFRP from the access node;
- The UE receives a frame on a PDCCH, after beam failure recovery;
- The UE decodes the frame by assuming that a DMRS of the PDCCH is not QCL'ed with the first RS. In other words, the DMRS of the PDCCH does not have a QCL relationship with the first RS.

It is noted that the QCL configuration may be conveyed via RRC or RRC and MAC CE signaling. It is noted that the first RS may be from a first set of TCI states. It is noted that the PDCCH may carry a TCI field and the TCI field is set to a predetermined value. The predetermined value may be set to zero. The predetermined value may be set to a maximum value that the TCI field is capable of representing, e.g., seven if the TCI field is three bits long, three if the TCI field is two bits long, etc. The predetermined value may be set to a value that no specific RS is mapped to in the TCI field. As an example, if the length of the TCI field is 2 bits long, implying that there are 4 states that the TCI field is capable of representing. If there are only 2 states mapped to the TCI field, e.g., state 0 and state 1, then states 2 and 3 may be the predetermined values. It is noted that the BFRP may carry a TCI field and the TCI field is set to a predetermined value. It is noted that the TCI field in the BFRP may be set to a predetermined value as described above.

The PDCCH frame decoding process may also include:
The UE receives signaling that updates a QCL configuration for PDCCH, where the QCL configuration for PDCCH includes an information that a second RS from a second set of TCI states is spatially QCL'ed with a DMRS of PDCCH;
The UE receives a second frame on the PDCCH, after beam failure recovery;
The UE decodes the second frame by assuming that a DMRS of the PDCCH is QCL'ed with the second RS from the second set of TCI states.

Figure 8A:
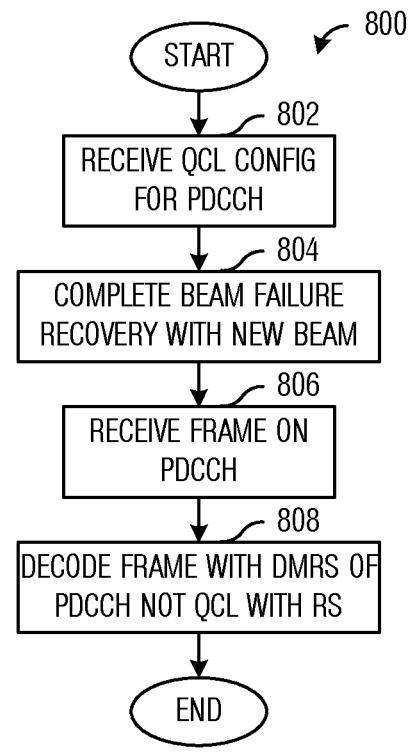
FIG. 8A illustrates a flow diagram of example operations occurring in a UE participating in a beam failure detection, a beam failure recovery, and a decoding of a frame on a PDCCH according to example embodiments described herein.

FIG. 8A illustrates a flow diagram of example operations 800 occurring in a UE participating in a beam failure detection, a beam failure recovery, and a decoding of a frame on a PDCCH.

Operations 800 begin with the UE receiving a first information from an access node regarding a QCL configuration for PDCCH (block 802). The QCL configuration for PDCCH includes a second information that a first RS from a first set of TCI states is spatially QCL'ed with a DMRS of PDCCH. The UE completes a beam failure recovery procedure (block 804). Part of the beam failure recovery procedure includes the UE selecting a new beam or receiving information about the new beam. The UE receives a frame on a PDCCH (block 806). The UE decodes the frame (block 808). The UE decodes the frame by assuming that a DMRS of the PDCCH is not QCL'ed with the first RS from the first set of TCI states, for example.

In a second embodiment of the second example embodiment, a PDSCH frame decoding process, where a TCI field is present in a DCI that schedules the PDSCH, may be as follows:
A UE receives an information from an access node regarding mapping between TCI states and TCI field in the DCI;
The UE detects a beam failure;
The UE sends a BFRQ to the access node;
The UE receives a BFRP from the access node;
The UE receives a first control frame (e.g., DCI) that schedules a first data frame on a PDSCH, where the first control frame includes a TCI field;
The UE decodes the first data frame by assuming that a DMRS of the PDSCH is not QCL'ed with an identified RS.

It is noted that the QCL configuration may be conveyed via RRC or RRC and MAC CE signaling. It is noted that the identified RS may be identified by the TCI field. It is noted that the TCI field may be set to a predetermined value. The predetermined value may be set to zero. The predetermined value may be set to a maximum value that the TCI field is capable of representing, e.g., seven if the TCI field is three bits long, three if the TCI field is two bits long, etc. The predetermined value may be set to a value that no specific RS is mapped to in the TCI field. As an example, if the length of the TCI field is 2 bits long, implying that there are 4 states that the TCI field is capable of representing. If there are only 2 states mapped to the TCI field, e.g., state 0 and state 1, then states 2 and 3 may be the predetermined values.

The PDSCH frame decoding process may also include:
The UE receives a signaling that updates a QCL configuration for PDSCH, where the QCL configuration for PDSCH includes an information that a second RS is included to a set of RSs that the TCI field represents;
The UE receives a second control frame that schedules a second data frame on a second PDSCH, where the second control frame includes a TCI field;
The UE decodes the second data frame by assuming that a DMRS of the PDSCH is QCL'ed with a second RS identified by the TCI field.

The PDSCH frame decoding process may further include:
The BFRQ includes an information that a first RS is a new candidate beam;
The first RS and the second RS are identical.

Figure 8B:
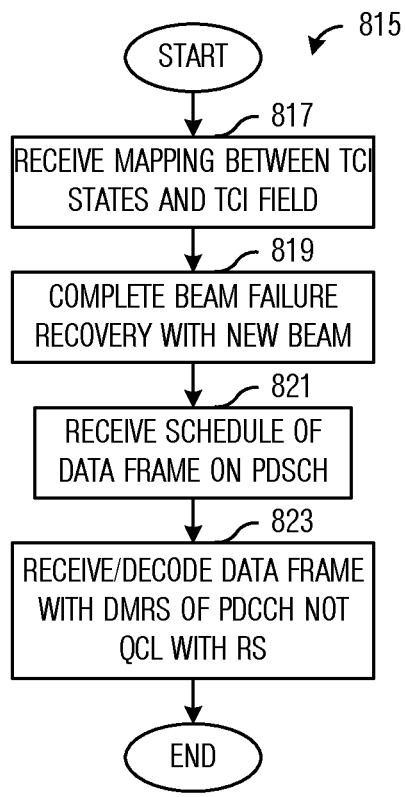
FIG. 8B illustrates a flow diagram of example operations occurring in a UE participating in a beam failure detection, a beam failure recovery, and a decoding of a frame on a PDSCH, where a TCI field is present in a DCI that schedules the PDSCH according to example embodiments described herein.

FIG. 8B illustrates a flow diagram of example operations 815 occurring in a UE participating in a beam failure detection, a beam failure recovery, and a decoding of a frame on a PDSCH, where a TCI field is present in a DCI that schedules the PDSCH.

Operations 815 begin with the UE receiving a mapping between TCI states and a TCI field in the DCI (block 817). The UE completes a beam failure recovery procedure (block 819). Part of the beam failure recovery procedure includes the UE selecting a new beam or receiving information about the new beam. The UE receives a first control frame that schedules a first data frame on a PDSCH (block 821). The first control frame may be a DCI. The first control frame may include a TCI field. The UE receives and decodes the data frame (block 823). The UE decodes the data frame by assuming that a DMRS of the PDSCH is not QCL'ed with a RS identified by the TCI field, for example.

In a third embodiment of the second example embodiment, a PDSCH frame decoding process, where the TCI field is not present in a DCI that schedules the PDSCH, may be as follows:
A UE determines a first RS that is QCL'ed with a DMRS for PDSCH decoding;
The UE detects a beam failure;
The UE sends a BFRQ to the access node;
The UE receives a BFRP from the access node;
The UE receives a first data frame on a PDSCH;
The UE decodes the first data frame by assuming that a DMRS of the PDSCH is not QCL'ed with the first RS.

Figure 8C:
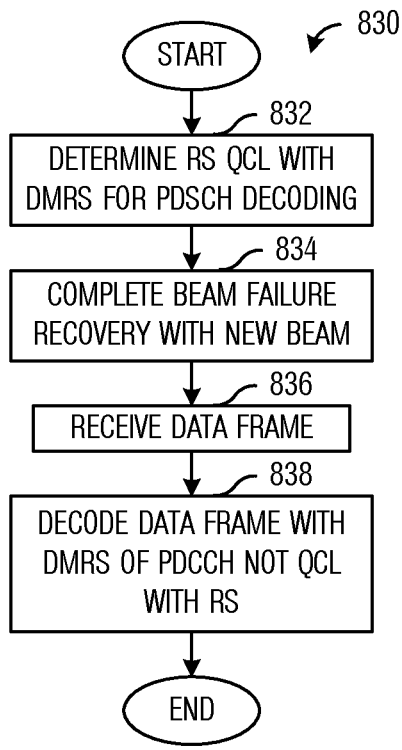
FIG. 8C illustrates a flow diagram of example operations occurring in a UE participating in a beam failure detection, a beam failure recovery, and a decoding of a frame on a PDSCH, where a TCI field is not present in a DCI that schedules the PDSCH according to example embodiments described herein.

FIG. 8C illustrates a flow diagram of example operations 830 occurring in a UE participating in a beam failure detection, a beam failure recovery, and a decoding of a frame on a PDSCH, where a TCI field is not present in a DCI that schedules the PDSCH.

Operations 830 begin with the UE determining a first RS that is QCL'ed with a DMRS for PDSCH decoding (block 832). The UE completes a beam failure recovery procedure (block 834). Part of the beam failure recovery procedure includes the UE selecting a new beam or receiving information about the new beam. The UE receives a first data frame on a PDSCH (block 836). The UE decodes the first data frame (block 838). The UE decodes the first data frame by assuming that a DMRS of the PDSCH is not QCL'ed with the first RS, for example.

In a fourth embodiment of the second example embodiment, a PDSCH frame decoding process, where the TCI field is present in a DCI that schedules the PDSCH, may be as follows:

A UE receives an information from an access node regarding a mapping between TCI states and the TCI field in the DCI;

The UE receives a first control frame (e.g., DCI) that schedules a first data frame on a PDSCH, where the first control frame includes the TCI field;

If the TCI field is set to a first value, the UE decodes the first data frame by assuming that a DMRS of the PDSCH is not QCL'ed with an identified RS;

If the TCI field is set to a value other than the first value, the UE decodes the first data frame by assuming that a DMRS of the PDSCH is QCL'ed with a RS identified by the TCI field.

In a fifth embodiment of the second example embodiment, a PDSCH frame decoding process, where the TCI field is present in a DCI that schedules the PDSCH, may be as follows:

A UE receives an information from an access node regarding a mapping between TCI states and the TCI field in the DCI;

The UE receives a first control frame (e.g., DCI) that schedules a first data frame on a PDSCH, where the first control frame includes the TCI field;

If the TCI field is set to a first value, the UE decodes the first data frame by assuming that a DMRS of the PDSCH is QCL'ed with a DMRS of a PDCCH that carries the first control frame;

If the TCI field is set to a value other than the first value, the UE decodes the first data frame by assuming that a DMRS of the PDSCH is QCL'ed with a RS identified by the TCI field.

Figure 8D:
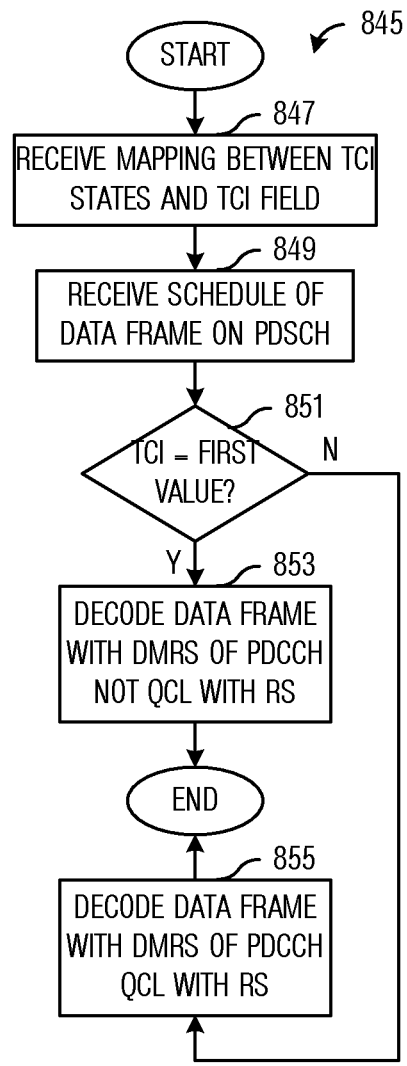
FIG. 8D illustrates a flow diagram of example operations occurring in a UE participating in a beam failure detection, a beam failure recovery, and a decoding of a frame on a PDSCH, where a TCI field is present in a DCI that schedules the PDSCH and preset values are used according to example embodiments described herein.

FIG. 8D illustrates a flow diagram of example operations 845 occurring in a UE participating in a beam failure detection, a beam failure recovery, and a decoding of a frame on a PDSCH, where a TCI field is present in a DCI that schedules the PDSCH and preset values are used.

Operations 845 begin with the UE receiving a mapping between TCI states and a TCI field in the DCI (block 847). The UE receives a first control frame that schedules a first data frame on a PDSCH (block 849). The first control frame may be a DCI. The first control frame may include a TCI field. The UE performs a check to determine if the TCI field is set to a first value (block 851). If the TCI field is set to the first value, the UE decodes the first data frame by assuming that a DMRS of the PDSCH is not QCL'ed with a RS identified by the TCI field (block 853). In another embodiment, if the TCI field is set to the first value, the UE decodes the first data frame by assuming that a DMRS of the PDSCH is QCL'ed with a DMRS of a PDCCH that carries the first control frame. If the TCI field is not set to the first value, the UE decodes the first data frame by assuming that a DMRS of the PDSCH is QCL'ed with a RS identified by the TCI field (block 854).

Figure 9:
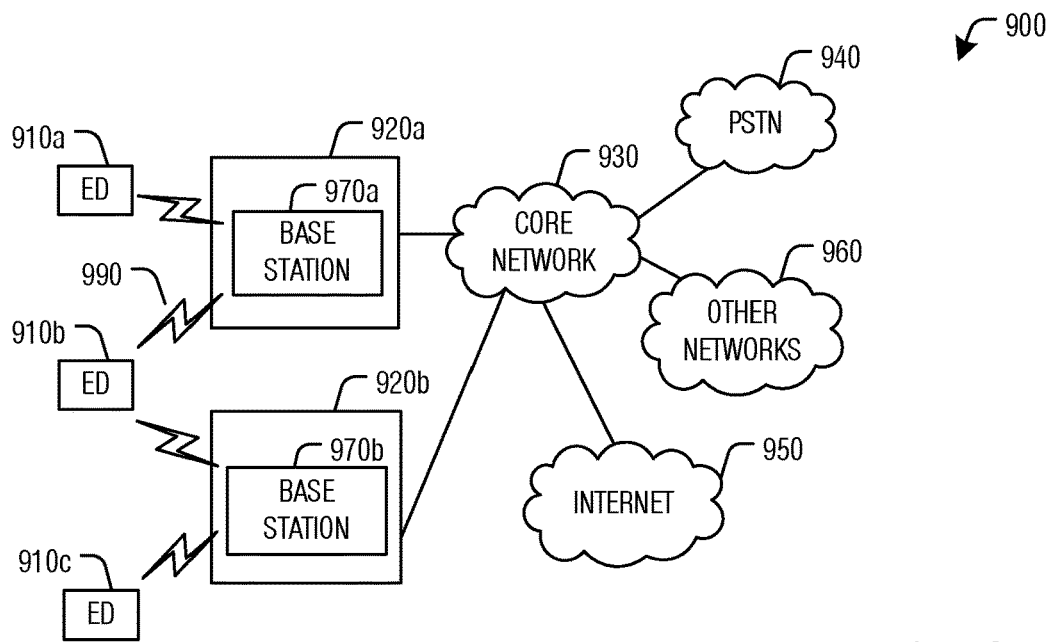
FIG. 9 illustrates an example communication system according to example embodiments described herein.

FIG. 9 illustrates an example communication system 900. In general, the system 900 enables multiple wireless or wired users to transmit and receive data and other content. The system 900 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 900 includes electronic devices (ED) 910a-910c, radio access networks (RANs) 920a-920b, a core network 930, a public switched telephone network (PSTN) 940, the Internet 950, and other networks 960. While certain numbers of these components or elements are shown in FIG. 9, any number of these components or elements may be included in the system 900.

The EDs 910a-910c are configured to operate or communicate in the system 900. For example, the EDs 910a-910c are configured to transmit or receive via wireless or wired communication channels. Each ED 910a-910c represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 920a-920b here include base stations 970a-970b, respectively. Each base station 970a-970b is configured to wirelessly interface with one or more of the EDs 910a-910c to enable access to the core network 930, the PSTN 940, the Internet 950, or the other networks 960. For example, the base stations 970a-970b may include (or be) one or more of several well-known devices, such as a base transceiver station (BTS), a Node-B (NodeB), an evolved NodeB (eNodeB), a Home NodeB, a Home eNodeB, a site controller, an access point (AP), or a wireless router. The EDs 910a-910c are configured to interface and communicate with the Internet 950 and may access the core network 930, the PSTN 940, or the other networks 960.

In the embodiment shown in FIG. 9, the base station 970a forms part of the RAN 920a, which may include other base stations, elements, or devices. Also, the base station 970b forms part of the RAN 920b, which may include other base stations, elements, or devices. Each base station 970a-970b operates to transmit or receive wireless signals within a particular geographic region or area, sometimes referred to as a "cell." In some embodiments, multiple-input multiple-output (MIMO) technology may be employed having multiple transceivers for each cell.

The base stations 970a-970b communicate with one or more of the EDs 910a-910c over one or more air interfaces 990 using wireless communication links. The air interfaces 990 may utilize any suitable radio access technology.

It is contemplated that the system 900 may use multiple channel access functionality, including such schemes as described above. In particular embodiments, the base stations and EDs implement LTE, LTE-A, or LTE-B. Of course, other multiple access schemes and wireless protocols may be utilized.

The RANs 920a-920b are in communication with the core network 930 to provide the EDs 910a-910c with voice, data, application, Voice over Internet Protocol (VoIP), or other services. Understandably, the RANs 920a-920b or the core network 930 may be in direct or indirect communication with one or more other RANs (not shown). The core network 930 may also serve as a gateway access for other networks (such as the PSTN 940, the Internet 950, and the other networks 960). In addition, some or all of the EDs 910a-910c may include functionality for communicating with different wireless networks over different wireless links using different wireless technologies or protocols. Instead of wireless communication (or in addition thereto), the EDs may communicate via wired communication channels to a service provider or switch (not shown), and to the Internet 950.

Although FIG. 9 illustrates one example of a communication system, various changes may be made to FIG. 9. For example, the communication system 900 could include any number of EDs, base stations, networks, or other components in any suitable configuration.

Figure 10A:
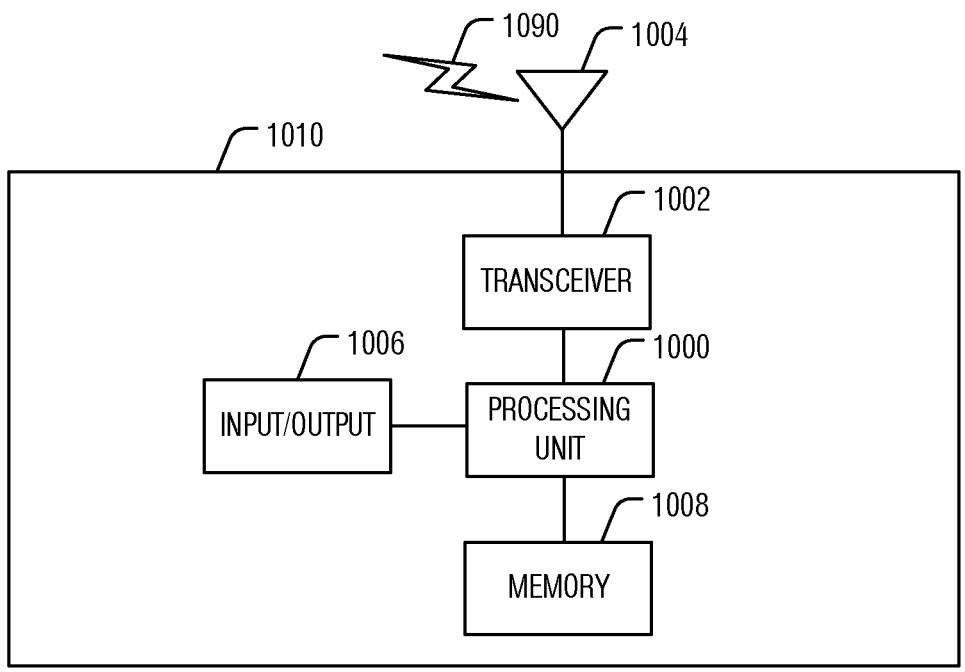
FIGS. 10A and 10B illustrate example devices that may implement the methods and teachings according to this disclosure.
Figure 10B:
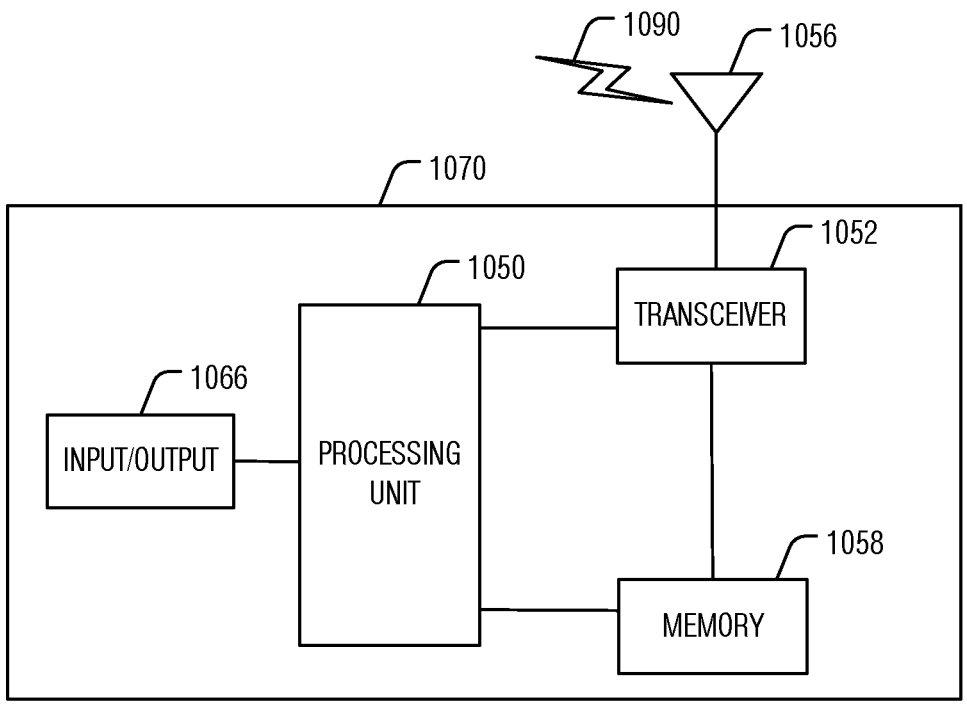

FIGS. 10A and 10B illustrate example devices that may implement the methods and teachings according to this disclosure. In particular, FIG. 10A illustrates an example ED 1010, and FIG. 10B illustrates an example base station 1070. These components could be used in the system 900 or in any other suitable system.

As shown in FIG. 10A, the ED 1010 includes at least one processing unit 1000. The processing unit 1000 implements various processing operations of the ED 1010. For example, the processing unit 1000 could perform signal coding, data processing, power control, input/output processing, or any other functionality enabling the ED 1010 to operate in the system 900. The processing unit 1000 also supports the methods and teachings described in more detail above. Each processing unit 1000 includes any suitable processing or computing device configured to perform one or more operations. Each processing unit 1000 could, for example, include a microprocessor, microcontroller, digital signal processor, field programmable gate array, or application specific integrated circuit.

The ED 1010 also includes at least one transceiver 1002. The transceiver 1002 is configured to modulate data or other content for transmission by at least one antenna or NIC (Network Interface Controller) 1004. The transceiver 1002 is also configured to demodulate data or other content received by the at least one antenna 1004. Each transceiver 1002 includes any suitable structure for generating signals for wireless or wired transmission or processing signals received wirelessly or by wire. Each antenna 1004 includes any suitable structure for transmitting or receiving wireless or wired signals. One or multiple transceivers 1002 could be used in the ED 1010, and one or multiple antennas 1004 could be used in the ED 1010. Although shown as a single functional unit, a transceiver 1002 could also be implemented using at least one transmitter and at least one separate receiver.

The ED 1010 further includes one or more input/output devices 1006 or interfaces (such as a wired interface to the Internet 950). The input/output devices 1006 facilitate interaction with a user or other devices (network communications) in the network. Each input/output device 1006 includes any suitable structure for providing information to or receiving or providing information from a user, such as a speaker, microphone, keypad, keyboard, display, or touch screen, including network interface communications.

In addition, the ED 1010 includes at least one memory 1008. The memory 1008 stores instructions and data used, generated, or collected by the ED 1010. For example, the memory 1008 could store software or firmware instructions executed by the processing unit(s) 1000 and data used to reduce or eliminate interference in incoming signals. Each memory 1008 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 10B, the base station 1070 includes at least one processing unit 1050, at least one transceiver 1052, which includes functionality for a transmitter and a receiver, one or more antennas 1056, at least one memory 1058, and one or more input/output devices or interfaces 1066. A scheduler, which would be understood by one skilled in the art, is coupled to the processing unit 1050. The scheduler could be included within or operated separately from the base station 1070. The processing unit 1050 implements various processing operations of the base station 1070, such as signal coding, data processing, power control, input/output processing, or any other functionality. The processing unit 1050 can also support the methods and teachings described in more detail above. Each processing unit 1050 includes any suitable processing or computing device configured to perform one or more operations. Each processing unit 1050 could, for example, include a microprocessor, microcontroller, digital signal processor, field programmable gate array, or application specific integrated circuit.

Each transceiver 1052 includes any suitable structure for generating signals for wireless or wired transmission to one or more EDs or other devices. Each transceiver 1052 further includes any suitable structure for processing signals received wirelessly or by wire from one or more EDs or other devices. Although shown combined as a transceiver 1052, a transmitter and a receiver could be separate components. Each antenna 1056 includes any suitable structure for transmitting or receiving wireless or wired signals. While a common antenna 1056 is shown here as being coupled to the transceiver 1052, one or more antennas 1056 could be coupled to the transceiver(s) 1052, allowing separate antennas 1056 to be coupled to the transmitter and the receiver if equipped as separate components. Each memory 1058 includes any suitable volatile or non-volatile storage and retrieval device(s). Each input/output device 1066 facilitates interaction with a user or other devices (network communications) in the network. Each input/output device 1066 includes any suitable structure for providing information to or receiving or providing information from a user, including network interface communications.

Figure 11:
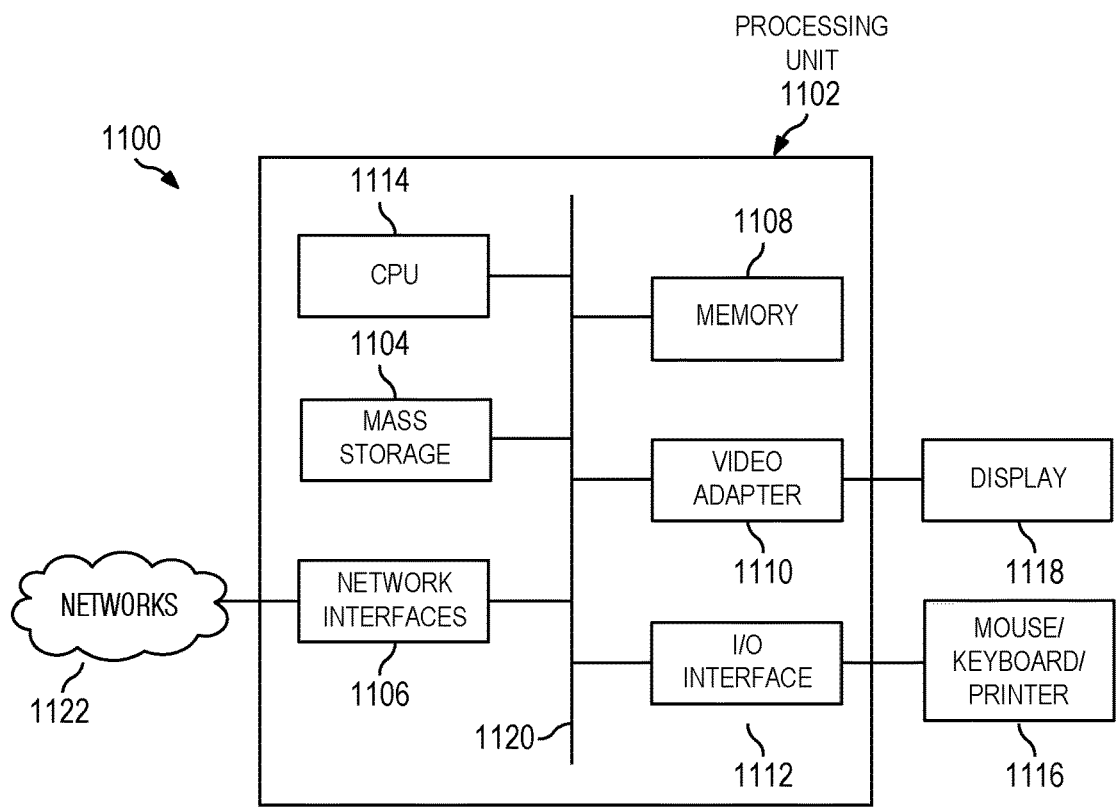
FIG. 11 is a block diagram of a computing system that may be used for implementing the devices and methods disclosed herein.

FIG. 11 is a block diagram of a computing system 1100 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1100 includes a processing unit 1102. The processing unit includes a central processing unit (CPU) 1114, memory 1108, and may further include a mass storage device 1104, a video adapter 1110, and an I/O interface 1112 connected to a bus 1120.

The bus 1120 may be one or more of any type of several bus architectures including a memory bus or memory controller, a peripheral bus, or a video bus. The CPU 1114 may comprise any type of electronic data processor. The memory 1108 may comprise any type of non-transitory system memory such as static random access memory (SRAM), dynamic random access memory (DRAM), synchronous DRAM (SDRAM), read-only memory (ROM), or a combination thereof. In an embodiment, the memory 1108 may include ROM for use at boot-up, and DRAM for program and data storage for use while executing programs.

The mass storage 1104 may comprise any type of non-transitory storage device configured to store data, programs, and other information and to make the data, programs, and other information accessible via the bus 1120. The mass storage 1104 may comprise, for example, one or more of a solid state drive, hard disk drive, a magnetic disk drive, or an optical disk drive.

The video adapter 1110 and the I/O interface 1112 provide interfaces to couple external input and output devices to the processing unit 1102. As illustrated, examples of input and output devices include a display 1118 coupled to the video adapter 1110 and a mouse, keyboard, or printer 1116 coupled to the I/O interface 1112. Other devices may be coupled to the processing unit 1102, and additional or fewer interface cards may be utilized. For example, a serial interface such as Universal Serial Bus (USB) (not shown) may be used to provide an interface for an external device.

The processing unit 1102 also includes one or more network interfaces 1106, which may comprise wired links, such as an Ethernet cable, or wireless links to access nodes or different networks. The network interfaces 1106 allow the processing unit 1102 to communicate with remote units via the networks. For example, the network interfaces 1106 may provide wireless communication via one or more transmitters or transmit antennas and one or more receivers or receive antennas. In an embodiment, the processing unit 1102 is coupled to a local-area network 1122 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a decoding unit or module. The respective units or modules may be hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method, comprising:
   receiving, by an access node from a user equipment (UE), a beam failure recovery request (BFRQ) for initiating a beam failure recovery, the BFRQ indicating a first reference signal selected by the UE, the first reference signal corresponding to a new beam;
   during the beam failure recovery, transmitting, by the access node, a response to the BFRQ based on a first quasi co-located (QCL) relationship between the first reference signal and a second reference signal, and the second reference signal being a demodulation reference signal (DMRS) of a physical downlink control channel (PDCCH) for transmitting the response; and
   after completion of the beam failure recovery, transmitting, by the access node, a transmission on the PDCCH or a physical downlink shared channel (PDSCH) based on a second QCL relationship between the first reference signal and a third reference signal, the third reference signal being the DMRS of the PDCCH or a DMRS of the PDSCH.

2. The method of claim 1, wherein the method further comprises:
   transmitting, by the access node, downlink control information (DCI) for scheduling the PDSCH.

3. The method of claim 1, wherein the method further comprises:
   using, by the access node, an updated QCL relationship between a fourth reference signal and the DMRS of the PDCCH or the DMRS of the PDSCH for transmitting PDSCH data or PDCCH data to the UE, the fourth reference signal corresponding to a first beam.

4. The method of claim 3, wherein the first beam is the new beam selected by the UE.

5. The method of claim 3, wherein the first beam is another beam different from the new beam selected by the UE.

6. The method of claim 3, the updated QCL relationship being a transmission configuration indication (TCI) state.

7. The method of claim 6, the TCI state being carried in a higher layer message.

8. The method of claim 1, the transmitting the transmission on the PDCCH or the PDSCH comprising:
   transmitting the transmission on the PDCCH or the PDSCH before any updated QCL configuration responsive to the BFRQ is sent.

9. An access node comprising:
   at least one processor; and
   a non-transitory computer readable storage medium storing programming for execution by the at least one processor, the programming including instructions to cause the access node to perform operations including:
   receiving, from a user equipment (UE), a beam failure recovery request (BFRQ) for initiating a beam failure recovery, the BFRQ indicating a first reference signal selected by the UE, the first reference signal corresponding to a new beam;
   during the beam failure recovery, transmitting a response to the BFRQ based on a first quasi co-located (QCL) relationship between the first reference signal and a second reference signal, and the second reference signal being a demodulation reference signal (DMRS) of a physical downlink control channel (PDCCH) for transmitting the response; and
   after completion of the beam failure recovery, transmitting a transmission on the PDCCH or a physical downlink shared channel (PDSCH) based on a second QCL relationship between the first reference signal and a third reference signal, the third reference signal being the DMRS of the PDCCH or a DMRS of the PDSCH.

10. The access node of claim 9, the operations further comprising:
    transmitting downlink control information (DCI) for scheduling the PDSCH.

11. The access node of claim 9, the operations further comprising:
    using an updated QCL relationship between a fourth reference signal and the DMRS of the PDCCH or the DMRS of the PDSCH for transmitting PDSCH data or PDCCH data to the UE, the fourth reference signal corresponding to a first beam.

12. The access node of claim 11, wherein the first beam is the new beam selected by the UE.

13. The access node of claim 11, wherein the first beam is another beam different from the new beam selected by the UE.

14. The access node of claim 11, the updated QCL relationship being a transmission configuration indication (TCI) state.

15. The access node of claim 14, the TCI state being carried in a higher layer message.

16. The access node of claim 9, the transmitting the transmission on the PDCCH or the PDSCH comprising:

transmitting the transmission on the PDCCH or the PDSCH before any updated QCL configuration responsive to the BFRQ is sent.

17. A non-transitory storage medium comprising a program that, when executed by an access node, causes the access node to perform operations including:
   receiving, from a user equipment (UE), a beam failure recovery request (BFRQ) for initiating a beam failure recovery, the BFRQ indicating a first reference signal selected by the UE, the first reference signal corresponding to a new beam;
   during the beam failure recovery, transmitting a response to the BFRQ based on a first quasi co-located (QCL) relationship between the first reference signal and a second reference signal, and the second reference signal being a demodulation reference signal (DMRS) of a physical downlink control channel (PDCCH) for transmitting the response; and
   after completion of the beam failure recovery, transmitting a transmission on the PDCCH or a physical downlink shared channel (PDSCH) based on a second QCL relationship between the first reference signal and a third reference signal, the third reference signal being the DMRS of the PDCCH or a DMRS of the PDSCH.

18. The non-transitory storage medium of claim 17, the operations further comprising:
   transmitting, by the access node, downlink control information (DCI) for scheduling the PDSCH.

19. The non-transitory storage medium of claim 17, the operations further comprising:
   using an updated QCL relationship between a fourth reference signal and the DMRS of the PDCCH or the DMRS of the PDSCH for transmitting PDSCH data or PDCCH data to the UE, the fourth reference signal corresponding to a first beam.

20. The non-transitory storage medium of claim 19, wherein the first beam is the new beam selected by the UE.

21. The non-transitory storage medium of claim 19, wherein the first beam is another beam different from the new beam selected by the UE.

22. The non-transitory storage medium of claim 19, the updated QCL relationship being a transmission configuration indication (TCI) state.

23. The non-transitory storage medium of claim 22, the TCI state being carried in a higher layer message.

24. The non-transitory storage medium of claim 17, the transmitting the transmission on the PDCCH or the PDSCH comprising:
   transmitting the transmission on the PDCCH or the PDSCH before any updated QCL configuration responsive to the BFRQ is sent.

* * * * *